United States Patent Office 3,507,705
Patented Apr. 21, 1970

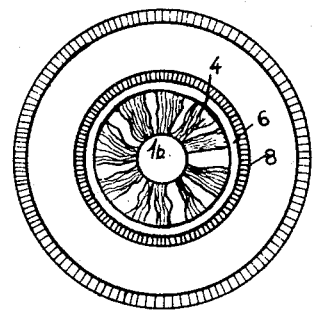
FIG.4
FIG.5
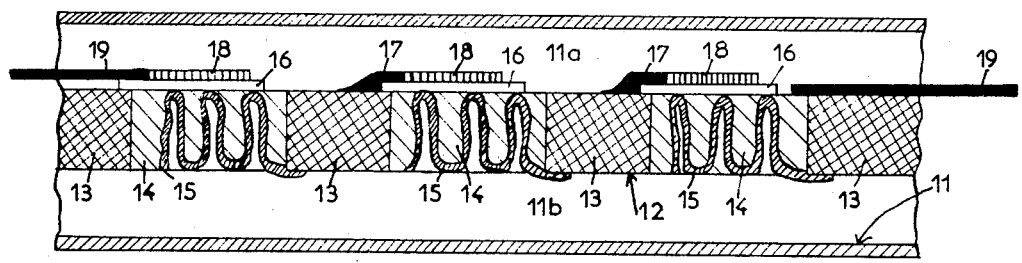
FIG.6
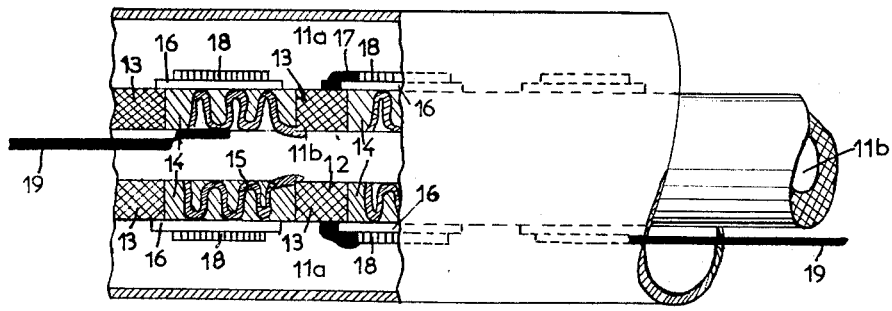

3,507,705
SOLID ELECTROLYTE FUEL-CELL BATTERY
Helmut Tannenberger and Herbert Schachner, Geneva, and Wolfgang Simm, Lausanne, Switzerland, assignors to Compagnie Francaise de Raffinage, Paris, France
Continuation-in-part of application Ser. No. 280,799, May 16, 1963. This application Sept. 3, 1968, Ser. No. 756,957
Claims priority, application Switzerland, May 23, 1962, 6,216/62
Int. Cl. H01m 27/06
U.S. Cl. 136—86                    5 Claims

ABSTRACT OF THE DISCLOSURE

A fuel cell battery has been provided which is of a solid electrolyte operating at high temperature, consisting of a plurality of elements each comprising a first electron-conductive electrode, a second electron-conductive electrode of a sign opposite the sign of the said first electrode and a solid electrolyte of a cubic-phase stabilized zirconia arranged between said first and second electrodes and in contact with the same, the said first electrode of the said plurality of elements being electrically insulated from each other and forming part of a separator which assures the mechanical strength of the said batteries and divides the enclosure in which the battery of cells is placed into two compartments for a stream of fuel gas and a stream of comburant flowing separately from each other, the electrolyte of each element being arranged as a thin layer on said separator and in contact with said first electrode, so that the separator-electrolyte assembly of the said element is impermeable to gas, an electron-conductive material being arranged between each of the electrolytes of the different elements and connecting each of the said first electrodes forming part of the separator to said second electrode of the adjacent element, the current produced being collected by electronic conductors in contact with an electrode of the first element of the battery and the electrode of opposite sign of the last element thereof.

---

This application is a continuation-in-part of Ser. No. 280,799 filed May 16, 1963, the subject therein being carried forward and incorporated by reference herein.

The present invention relates to fuel cells with solid electrolyte; more particularly, it relates to batteries of fuel cells with a solid electrolyte.

It is known that fuel cells are at present the subject of a large amount of research work in order to improve their technology; since, although the theory thereof has been known for a long time, there has never been perfected a cell capable of operating under normal conditions while consuming ordinary reagents. However, electrochemical combustion which takes place in a cell avoids the limiting efficiency present in the case of a thermal motor working under the Carnot principle; consequently, this fact is inducing the industry to seek solutions to the technological problems of fuel cells.

The work on fuel cells has been oriented in various directions and makes use of aqueous electrolytes operating at low temperature or molten-salt electrolytes operating at higher temperatures and even to solid electrolytes operating at higher temperatures yet.

As it is known, this latter type has substantial advantages over the other types studied; it may particularly be mentioned their solid structure permitting easy handling, the possibility of burning hydrocarbons due to the high operating temperature, and the absence of corrosive liquids.

However, the solid electrolytes used in fuel cells have high resistivities and cause a loss of power due to the ohmic drop in voltage within the electrolyte itself; for example, when an electrolyte is formed of stabilized zirconia, the resistivity at 800° C. is about several tens of ohms per cm.[2]. Obviously, research carried out on this type of cell has led to a decrease in the thickness of the electrolyte so as to lower the internal resistance of the cell; but the decrease in the thickness of electrolyte results in mechanical fragility of the electrodes-electrolyte assembly, with the practical result that this solution has been abandoned in favor of thicker electrolytes which are, therefore, capable of affording better mechanical strength but which operate at a very high temperature of more than 1,000° C. in order to compensate for the loss of power due to the ohmic drop in voltage; these very high temperatures must, however, be avoided if one wishes to have maximum free energy and also if one desires to use, as electrode, solid silver which melts at 961° C.

A type of fuel cell operating at more than 1,000° C. with a solid electrolyte has been described in U.S. Patent 3,192,070. In the embodiments described in this patent, the electrolyte is of substantial thickness either to contain the molten silver electrode in the event that one cell has the shape of a cup or to assure the mechanical strength of the assembly in the event that the cell element is in the form of a tube having three concentric layers constituting, respectively, the first electrode, the electrolyte and the second electrode (of molten silver). To the thickness of the electrolyte (which causes the loss in power), there is added furthermore the difficulty of placing two elements in series. As a matter of fact, while the amount of current produced by a cell can be increased by increasing the surface of the electrodes, for instance by increasing the length of the tube having the three concentric layers; on the other hand, voltage obtained when placing two adjacent elements compactly in series cannot be increased.

The present invention overcomes the said drawbacks of the fuel cells with solid electrolyte.

According to the invention, an object of the same is to provide batteries consisting of fuel cell elements whose solid electrolyte may be of very slight thickness so as to cause only small ohmic losses, it being understood that in the present specification there is designated as "element" or "fuel cell element" an individual fuel cell, that is to say, the assembly consisting of an anode, an electrolyte, and a cathode, while the expression "battery" is used to designate an assembly of several fuel cell elements placed in series.

Another object is to provide fuel cell batteries operating at a temperature below the melting point of silver.

Still another object is to provide batteries consisting of fuel cell elements with solid electrolyte connected compactly in series with each other.

The object of the invention is a battery of solid electrolyte fuel cells operating at high temperature consisting of a plurality of elements each comprising a first electron-conductive electrode, a second electron-conductive electrode of sign opposite the sign of said first electrode, and a solid electrolyte of cubic-phase stabilized zirconia arranged between the said first and second electrodes and in contact with them, the said first electrodes of said elements being electrically insulated from each other and being part of a separator which assures the mechanical strength of the said batteries and divides the enclosure in which the battery of cells is placed into two compartments through which on the one hand an oxidizing gas and on the other hand a fuel gas can circulate separately, the electrolyte of each element being arranged in a thin layer on said separator in contact with said first associated electrode in such a manner that the separator-electrolyte assembly of the said eledent is impermeable to gases, a conductive material being arranged between the electrolytes of the different elements and connecting each of said first electrodes which are part of the separator to the said second electrode of the contiguous element, the current produced being collected by electronic conductors in contact with an electrode of the first element of the battery and the electrode of opposite sign of the last element thereof.

The invention will be better understood from the following description read in conjunction with the accompanying drawings in which:

FIGURE 4 is a section along the line IV—IV of FIGURE 3; and

FIGURES 5 and 6 show a first and second embodiment, respectively, of a variant of a battery in accordance with the invention.

Figure 1:
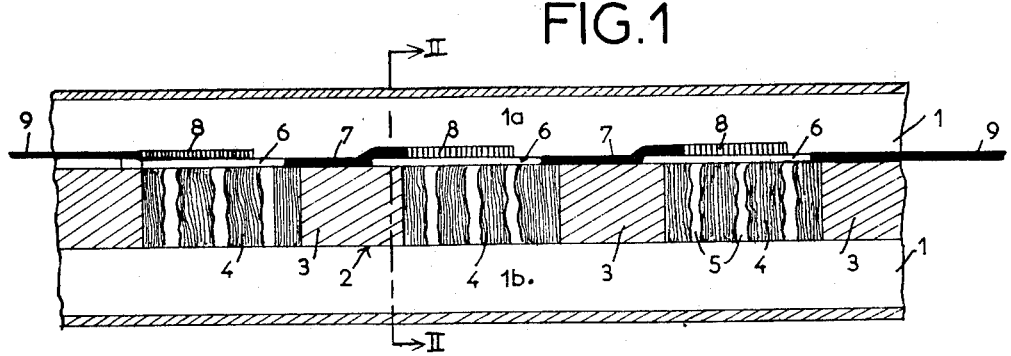
FIGURE 1 is a longitudinal section through three elements connected in series in accordance with the invention in order to form a battery.
Figure 2:
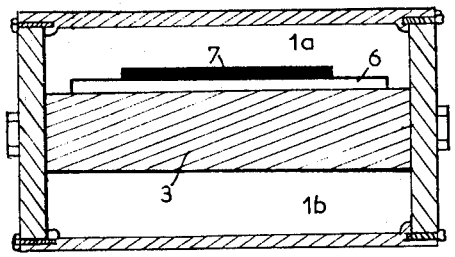
FIGURE 2 is a section along the line II—II of FIGURE 1.

As can be noted from FIGURES 1 and 2, the battery comprises an enclosure 1 separated into two conduits 1a and 1b by the separator 2; said separator itself is formed of an alternation of an inert non-conductive gas impermeable material 3, and anodes 4 of successive elements of the battery of fuel cells; in the present case, the said anodes are made of porous ferritic steel, the pores, indicated schematically by the channels 5, permitting the fuel gas to have access to the anode-electrolyte interface. The electrolytes 6 of the three elements of the battery are of gas impermeable stabilized zirconia and are arranged overlying the anodes; the electrolyte of each of the elements slightly protrudes onto the contiguous portion of an inert material 3 of the separator in such a manner as to separate from the anode of said element a conductive material 7 which electrically connects the anode 4 of the adjacent element to the silver cathode 8 of the element in question. From these figures, it can be seen that the conduits 1a and 1b are separated hermetically from each other, since the inert material is impermeable to gasses and the electrolyte, itself being impermeable, covers the porous part of the separator 2 which the anode constitutes. It is also seen—and this is an important point of the invention—that the electrolyte may be present in a very thin layer and, therefore, presents only minimum ohmic resistance, since the mechanical strength of the battery is assured by the separator 2, to which be imparted sufficient thickness to guarantee the mechanical properties without affecting the energy yield of the battery.

Finally, it is to be noted from these figures, the simplicity of how the cell elements are connected in series to constitute a battery; as a matter of fact, the electrical connection between the anode of one element and the cathode of the following element is assured by a layer of a material of any conductivity which may, for instance, be of the same nature as the cathode itself or consist of any other electronically conductive material. The current produced by this three-element battery can be collected by means of conductive wires identified as 9 in FIGURE 1.

Of course, the method of connecting the elements in series may be modified without thereby going beyond the scope of the invention. For example, it is not necessary that the electrolyte layer of each element protrude onto the inert material separating the anode of said element from the anode of the preceding element, but it is sufficient for the conductive material 7 which connects one anode to the cathode of the following element not to be in contact with the anode of the said following element. This separation can be obtained, for instance, by interposing a layer of an insulating material between the conductive material 7 and the anode of the following element. Other manners of effecting the connecting in series of the elements easily can be envisioned. As for the particular electrolyte to be incorporated in layer 6, satisfactory results are obtained with mixtures of various metal oxides, e.g., $ZrO_2+CaO$, $ZrO_2+MgO$, $ZrO_2+Y_2O_3$, $ZrO_2+Sc_2O_3$, $ThO_2+Y_2O_3$, etc., although particularly preferred electrolyte materials are mixtures of $$ZrO_2+CaO+MgO$$

as disclosed, for example, in the copending application Ser. No. 278,416, based upon Swiss application 5,474/62, filed May 7, 1962. In general, a cubic-phase stabilized zirconia, with stabilizers being the oxides of rare earth is a very suitable electrolyte.

For the different parts of the battery described above, materials other than those which have been indicated can be employed. In particular, the direction of the current can be reversed if the electrodes 4 and 8 were of other conductive materials than ferritic steel and silver; in this case, the oxidizing gas would be led to the cathode through the conduit 1b and the fuel gas would be led to the anode through the conduit 1a.

Figure 3:
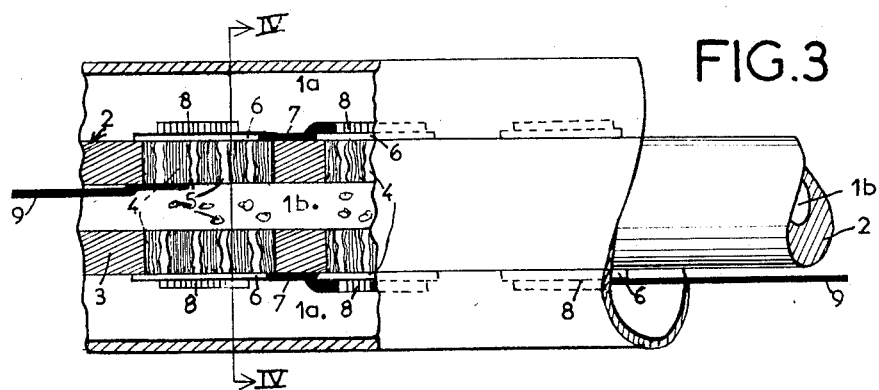
FIGURE 3 is a side view partially in section of a battery in accordance with a second embodiment of the invention.

FIGURE 3 shows a tubular arrangement of the battery of the invention. The parts already described are provided with the same reference numbers as in FIGURE 1. It can be noted in particular from FIGURE 3 that the separator 2 divides the enclosure of the battery into two conduits, namely 1a on the inside of the tube formed of the separator itself and 1b on the outside of said tube, between it and the enclosure of the battery. As in the case of the battery shown in FIGURE 1, the tightness to gases between the conduits 1a and 1b is assured by the inert, non-conductive material on the one hand and by the electrolyte covering the porous ferritic steel anode on the other hand. The conductors 7 which connect the anode of one element to the cathode of the following element form rings on the tube constituted by the separator 2. It will be understood that the tubular form of the battery in accordance with the invention makes it possible substantially to increase the solid electrolyte surface as compared with the volume of the battery and, therefore, to increase the specific power of this battery.

Various techniques can be employed for manufacturing the battery of the invention. The separator 2 may be formed by juxtaposing the porous electrodes and the gas impermeable, non-conductive, inert material; the electrolyte can then be deposited on said material in satisfactory manner by applying it in powder form and then sintering said powder at high temperature until obtaining a gas impermeable layer of electrolyte. Such sintering temperatures may be higher than the melting point of certain metals used for the electrodes themselves, so that one must adapt the metals used to the techniques of applying the electrolyte which are employed. The deposit of the electrodes bearing the reference 8 in FIGURES 1, 2, and 3 can be produced in particular by painting, the same as in the case of the conductors 7. The current leads and outputs 9 can be formed, for instance, of wires soldered to the corresponding electrodes at the ends of the battery.

When the electrolytes used for the manufacture of the battery must be sintered at very high temperatures, which are higher than the melting points of the metallic materials used to produce the electrode forming part of the separator 2, the means described below can be employed in which the electrode in question no longer consists of a conductive porous material but of a metallic layer deposited within the pores of a non-conductive but porous refractory material serving as support.

One such arrangement has been shown in FIGURE 5. The enclosure 11 of a battery having three fuel cell elements is separated into two conduits 11a and 11b by a separator 12 consisting alternately of electronic conductive portions 13 and portions of a porous refractory material 14. The porous refractory material can, for instance, be stabilized zirconia. In the pores of this material, there is deposited a metal layer 15 constituting the anode of the fuel cell elements of the battery. The average diameter of the pores of the refractory material 14 should preferably not be much greater than the thickness of the electrolyte layer 16, so that said material 14 can withstand on each side of the separator the variations in the pressure of gases to which the battery is subjected. The anode 15 is in contact with the electrolyte layer 16 covering the refractory porous material and which assures the gas tightness between the conduits 11a and 11b. The connecting in series the elements of the battery is effected by the electron conductors 17; the anode of one element is in electrical contact with the conductive portion 13 separating two adjacent elements, and the conductor 17 connects said conductive portion 13 to the cathode 18 of the following element. Conductors 19 make it possible to collect the current produced by the battery when an oxidizing gas is fed into same through the conduit 11a, while a fuel gas is fed via the conduit 11b, the temperature of the enclosure 11 being brought to about 800° C.

By means of this variant, the electrolytes 16 can be sintered at very high temperatures without damaging the refractory material 14 on which the conductor constituting the anodes 15 is then deposited. It can be seen from FIGURE 5 that the anodes 15 must be deposited in such a manner as to avoid electrical contact between the said anodes and the conductive materials 13.

FIGURE 6 shows a tubular mounting of a battery consisting of three fuel cell elements formed of parts similar to those of the battery shown in FIGURE 5. In both figures, similar parts are designated by the same reference numbers. The advantages of this connection over that of FIGURE 5 are the same as those of that of FIGURE 3 over the connection of FIGURE 1, that is to say, in particular, a greater specific power of the battery thus formed.

In addition to the materials used for the construction of the batteries shown in FIGURES 5 and 6, other materials permit the obtaining of satisfactory results; as porous refractory material there may be used ceramics which are different from the one constituting the electrolyte, in particular zirconia containing different proportions of stabilizing oxides.

If the composition of the refractory materials 14 is close to that of the electrolyte, this makes it possible to avoid the mechanical stresses which would be developed when the temperature rises due to the differences in coefficients of thermal expansion.

The batteries described above can operate both at atmospheric pressure and at higher pressures; when operating at elevated pressure, the rate of reaction between the gases and, therefore, the power of the battery is increased.

In the case of the batteries shown in FIGURES 1 to 4 and in the case of those shown in FIGURES 5 and 6, it is seen on the one hand that one can decrease the thickness of the electrolyte layer down to limits which are attainable by known means and, therefore, lower the internal electrical resistance of the battery, this result being obtained as a result of the support which is formed by the separator of which the anodes are a part (which assures the mechanical strength of the assembly); and on the other hand, the fuel cell elements of the battery can be connected in series simply by means of a conductor which can be deposited by painting or otherwise, in the same manner as the electrode itself.

Although the connections and arrangements of the batteries described constitute preferred embodiments of the invention, the invention is not limited to these precise connections and arrangements, and one can make changes therein without going beyond the scope of this invention, which is defined by the following claims.

What is claimed is:
1. A fuel cell battery with solid electrolyte operating at high temperature, consisting of a plurality of elements spaced from each other, each element comprising a first electron-conductive electrode, a second electron-conductive electrode of sign opposite the sign of the said first electrode and a solid electrolyte of a cubic-phase stabilized zirconia arranged between said first and second electrodes and in contact with the same, the said first electrode of the said plurality of elements being separated by and electrically insulated from each other by a gas impervious insulating means and forming part of a separator which assures the mechanical strength of the said batteries and divides the enclosure in which the battery of cells is placed into two compartments for a stream of fuel gas and a stream of oxidant gas flowing separately from each other, the electrolyte of each element being arranged as a thin layer on a portion of each of said first electrodes and a portion of each insulating means and in contact with said first electrode, so that the separator-electrolyte assembly of the said element is impermeable to gas, an electron-conductive material being arranged between each of the electrolytes of the different elements and connecting each of the said first electrodes forming part of the separator to said second electrode of the adjacent element, the current produced being collected by electronic conductors in contact with an electrode of the first element of the battery and the electrode of opposite sign of the last element thereof.

2. A fuel cell battery such as described in claim 1, in which the said separator is formed by an alternation of a gas impermeable, inert, refractory material and the said first electrodes of the plurality of elements, the said first electrodes being formed of a porous electron-conductive material and being covered by the said electrolytes so as to assure the impermeability to gases of the electrolyte-separator assembly.

3. A battery of fuel cells as described in claim 2, in which the said separator is of tubular shape so that one of the gaseous conduits is formed axially and centrally in the tube, while the other gaseous conduit is formed by the space between the periphery of the said tube and walls of an enclosure for the battery.

4. A fuel cell battery such as described in claim 1, in which the separator is formed by the alternation of a gas impermeable conductive material and a porous refractory material on which the electrolytes are arranged so as to make the separator-electrolyte assembly gas-tight, the said first electrodes being formed of a layer of an electron-conductive material deposited within the pores of the refractory material and in contact with the electrolyte, the said second electrodes being deposited on the electrolytes, the elements of one and the same battery being connected in series by electron conductors connecting each of the said second electrodes to the adjacent electron-conductive material of the separator, the said adjacent conductive material being in its turn in contact with the said first electrode of the adjacent element, the current produced by said battery being collected by electron conductors in electrical contact with an electrode of the first element and the electrode of opposite sign of the last element.

5. A fuel cell battery according to claim 4, in which the separator is of tubular shape so that one of the gaseous conduits is formed centrally and axially by the tube and the other gaseous conduit is formed by the space between the periphery of the said tube and walls of an enclosure for the battery.

References Cited

UNITED STATES PATENTS 3,460,991   8/1969   White _____ 136—86

WINSTON A. DOUGLAS, Primary Examiner

H. A. FEELEY, Assistant Examiner